United States Patent [19]
Gruffaz et al.

[11] 3,929,687
[45] Dec. 30, 1975

[54] MULLTICELLULAR POLYMERS MADE FROM THE REACTION PRODUCT OF MALEIC ANHYDRIDE WITH A POLYIMINE

[75] Inventors: Max Gruffaz, La Mulatière; Bernard Rollet, Lyon, both of France

[73] Assignee: Rhone-Poulenc, S.A., Paris, France

[22] Filed: Apr. 23, 1974

[21] Appl. No.: 463,248

[30] Foreign Application Priority Data
Apr. 26, 1973  France .......................... 73.15176

[52] U.S. Cl. ....... 260/2.5 EP; 260/2.5 F; 260/2.5 N; 260/47 EL; 260/78 UA; 260/830 R; 260/830 P; 260/841; 260/838; 260/857 R; 260/860; 260/873
[51] Int. Cl.² ............................................ C08J 9/00
[58] Field of Search ........ 260/2.5 N, 78 UA, 47 CZ, 260/47 UA, 2.5 EP, 2.5 F

[56] References Cited
OTHER PUBLICATIONS
Stillie et al., "A Novel Diels–Alder Polymerization" J.P.O.S., Part A, Vol. 2, pp. 1487–1491 (1964).

*Primary Examiner*—Richard B. Turer
*Attorney, Agent, or Firm*—Stevens, Davis, Miller & Mosher

[57] ABSTRACT

Multicellular materials which are lightweight, heat-resistant and flame-proof are produced by a process which comprises curing a liquid polymer in the presence of a reaction product of maleic anhydride with a polyimine of the general formula

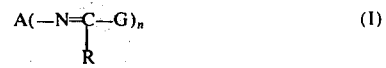

in which n represents a number at least equal to 2, G represents a monovalent organic radical containing less than 35 carbon atoms, R is as defined under G or represents a hydrogen atom, or G and R together form a divalent hydrocarbon radical, and A represents an organic radical of valency n containing 2 to 50 carbon atoms.

11 Claims, No Drawings

MULTICELLULAR POLYMERS MADE FROM THE REACTION PRODUCT OF MALEIC ANHYDRIDE WITH A POLYIMINE

This invention relates to multicellular polymers.

The use of multicellular synthetic materials has progressed considerably in recent years in many branches of industry, especially because of the advantages provided by their very low density. Because of their heat and sound insulating properties, these materials are used particularly for the manufacture of lightweight construction elements in the building industry and in the aeronautical and space field. The manufacture of cellular materials based on polymers which are heat-resistant and flameproof adds the guarantee of safety to these properties. It is particularly for this purpose that cellular materials based on epoxy resins and polyimides have been manfactured.

The present invention provides a process for preparing cellular materials which comprises curing a liquid polymer in the presence of the reaction product of maleic anhydride with a polyimine of the general formula:

in which $n$ represents a number at least equal to 2, G represents a monovalent organic radical containing less than 35 carbon atoms, R is as defined under G or represents a hydrogen atom, or G and R together represent a divalent hydrocarbon radical, and A represents an organic radical of valency n containing 2 to 50 carbon atoms.

In formula (I), each of the symbols G, which can be identical or different, and the symbol R, when it does not represent a hydrogen atom, may represent, for example, monovalent radicals such as:

a. saturated or unsaturated, linear or branched, aliphatic radicals containing up to 12 carbon atoms, for example a 2-methyl-propyl or n-hexyl radical, b. cycloalkyl radicals with 5, 6 or 7 carbon atoms in the ring, for example a cyclohexyl radical, and phenyl or naphthyl radicals, c. mono- or polycyclic heterocyclic radicals containing at least one O, N or S atom such as pyridyl, pyrimidinyl, furyl, thienyl, benzo[b]thienyl, indolyl, triazolyl and 3,4-methylenedioxy-phenyl radicals, d. radicals of the formulae Z—X'—Z'— and Z—X'λ'—Z'— in which Z represents a monovalent carbocyclic or heterocyclic radical as defined under b) and c) above, X' represents a valency bond or an inert atom or group such as —O—, —S—, —NH—, —COO—, —CONH—, —SO$_2$—, —N=N—, —N=N(→O)— and —CO—, X" represents a linear or branched alkylene or alkenylene group containing up to 13 carbon atoms, and Z' represents a divalent carbocyclic or heterocyclic radical corresponding to the monovalent radicals defined under b) and c), e. radicals of the formulae Z—X"— or X—Z'—, in which the symbols Z, Z' and X" are as defined above and X represents an alkyl or alkenyl radical as defined under a), and f. radicals as defined under b), c), d) or e) in which the rings are substituted by one or more atoms or groups such as F, Cl, Br, OH and NO$_2$. The symbols G and R, together with the carbon atoms of formula (I), can also form a cyclic hydrocarbon radical containing 4 to 7 carbon atoms, optionally substituted by one or more X radicals (X being as defined above) or by one or more atoms or groups as defined under f). The symbol A can denote an alkylene radical with less than 13 carbon atoms, a phenylene radical, a cyclohexylene radical or a radical of the formula:

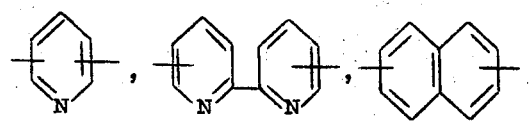

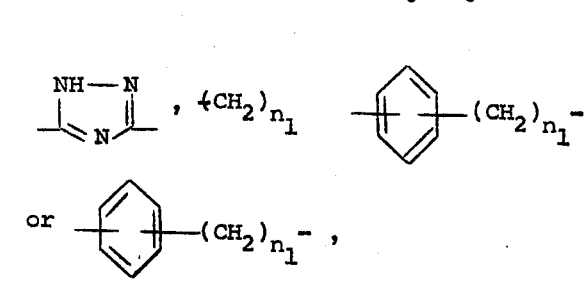

wherein $n_1$ represents an integer from 1 to 3. The symbol A can also represent a divalent radical with 12 to 30 carbon atoms consisting of phenylene or cyclohexylene radicals bonded to one another by a simple valency bond or by an inert atom or group such as —O—, —S—, and alkylene group with 1 to 3 carbon atoms, —CO—, —SO$_2$—, —NR$_1$—, —N=N—, —CONH—, —COO—, —P(O)R$_1$—, —CONH—X"—NHCO—, —N=N(→O)—,

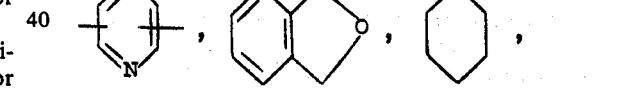

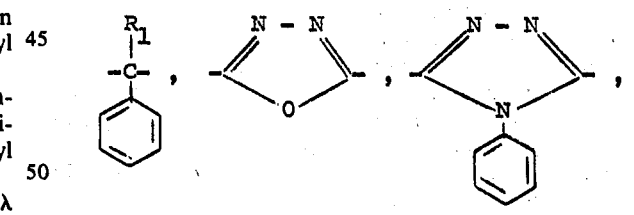

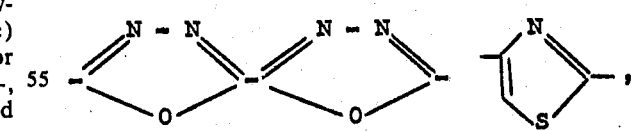

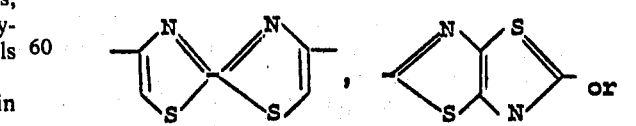

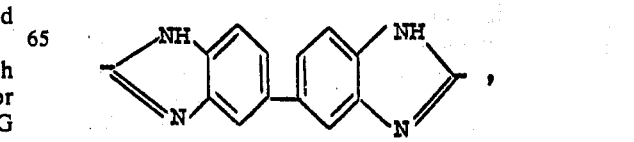

wherein $R_1$ represents a hydrogen atom, an alkyl radical with 1 to 4 carbon atoms, a phenyl radical or a cyclohexyl radical and X″ is as defined above under G. Moreover, the various phenylene or cyclohexylene radicals and the substituted by methyl groups.

The symbol A can also represent a radical containing up to 50 carbon atoms and possessing 3 to 5 free valencies, for example a 3 to 5 valent naphthalene, pyridine or triazine radical, a 3 to 5 valent radical having a benzene nucleus which can be substituted by one to three methyl groups, or several benzene nuclei bonded to one another by an inert atom or group which can be one of those indicated above or $$-\underset{|}{N}-, \ -\underset{|}{CH}-, \ -\underset{\underset{O-}{|}}{OP(O)O}-$$

and $$-\underset{\underset{O}{\|}}{P(O)}-.$$

The polyimines of formula (I) can be considered as being derived from the condensation of one mol of a primary polyamine of the formula:

$$A-(NH_2)_n \qquad (II)$$

with $n$ mols of a carbonyl compound of the formula:

$$G-C\underset{R}{\overset{O}{\diagup\!\!\!\diagdown}} \qquad (III)$$

in which n, A, G and R are as defined above.

Examples of polyamines of formula (II) which can be used for the preparation of polyimines (I) include 4,4′-diamino-dicyclohexylmethane, 1,4-diamino-cyclohexane, 2,6-diamino-pyridine, meta-phenylene-diamine, paraphenylene-diamine, 4,4′-diamino-diphenylmethane, 2,2-bis-(4-amino-phenyl)-propane, benzidine, 4,4′-diamino-phenyl ether, 4,4′-diamino-phenyl sulphide, 4,4′-diaminodiphenylsulphone, bis-(4-aminophenyl)-methyl-phosphine oxide, bis-(4-aminophenyl)-phenyl-phosphine oxide, N,N′-bis-(4-aminophenyl)-methylamine, 1,5-diaminonaphthalene, meta-xylylene-diamine, para-xylylene-diamine, 1,1-bis-(para-aminophenyl)-phthalene, hexamethylenediamine, 6,6′-diamino-2,2′-dipyridyl, 4,4′-diaminobenzophenone, 4,4′-diamino-azobenzene, bis-(4-aminophenyl)-phenylmethane, 1,1-bis-(4-amino-phenyl)-cyclohexane, 1,1-bis-(4-amino-3-methyl-phenyl)-cyclohexane, 2,5-bis-(m-amino-phenyl)-1,3,4-oxadiazole, 2,5-bis-(p-amino-phenyl)-1,3,4-oxadiazole, 2,5-bis-(m-aminophenyl)-thiazolo(4,5-d)thiazole, 5,5′-di-(m-amino-phenyl)-2,2′-bis-(1,3,4-oxadiazolyl), 4,4′-bis-(p-amino-phenyl)-2,2′-dithiazole, m-bis-[2-(4-p-amino-phenyl)thiazolyl]-benzene, 2,2′-bis-(m-amino-phenyl)-5,5′-dibenzimidazole, 4,4′-diamino-benzanilide, phenyl, 4,4′-diamino-benzoate, N,N′-bis-(4-amino-benzoyl)-p-phenylene-diamine, 3,5-bis-(m-amino-phenyl)-4-phenyl-1,2,4-triazole, N,N′-bis-(p-aminobenzoyl)-4,4′-diamino-diphenylmethane, bis-p-(4-amino-phenoxycarbonyl)benzene, bis-p-(4-amino-phenoxy)-benzene, 3,5-diamino-1,2,4-triazole, 1,1-bis-(4-aminophenyl)-1-phenyl-ethane, 3,5-bis-(4-amino-phenyl)-pyridine, 1,2,4-triamino-benzene, 1,3,5-triamino-benzene, 2,4,6-triamino-toluene, 2,4,6-triamino-1,3,5-trimethyl-benzene, 1,3,7-triamino-naphthalene, 2,4,4′-triamino-diphenyl, 2,4,6-triamino-pyridine, 2,4,4′-triamino-phenyl ether, 2,4,4′-triamino-diphenyl-methane, 2,4,4′-triaminodiphenylsulphone, 2,4,4′-triamino-benzophenone, 2,4,4′-triamino-3-methyl-diphenylmethane, N,N,N-tri-(4-aminophenyl)-amine, tri-(4-amino-phenyl)-methane, 4,4′,4″-triamino-phenyl orthophosphate, tri-(4-amino-phenyl)-phosphine oxide, 3,5,4′-triamino-benzanilide, melamine, 3,5,3′,5′-tetraamino-benzophenone, 1,2,4,5-tetraaminobenzene, 2,3,6,7-tetraamino-naphthalene, 3,3′-diaminobenzidine, 3,3′,4,4′-tetraaminophenyl ether, 3,3′,4,4′tetraamino-diphenylmethane, 3,3′,4,4′-tetraamino-diphenylsulphone, 3,5-bis-(3,4′-diamino-phenyl)-pyridine and oligomers of the average formula:

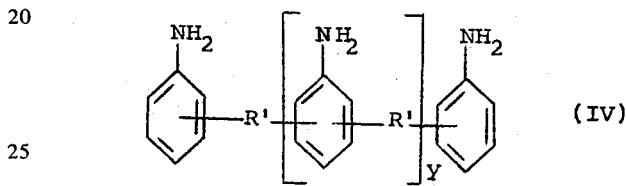 (IV)

in which y represents a number ranging approximately from 0.1 to 2 and R′ represents a divalent hydrocarbon radical of 1 to 8 carbon atoms and derived from an aldehyde or a ketone of the general formula:

$$O = R'$$

in which the oxygen atom is bonded to a carbon atom of the radical R′; typical such aldehydes and ketones include formaldehyde, acetaldehyde, benzaldehyde, oenanthal, acetone, methyl ethyl ketone, 2-hexanone, cyclohexanone and acetophenone. These oligomers possessing amino groups can be produced in accordance with known processes, such as those which are described in French Pat. Nos. 1,430,977, 1,481,935 and 1,533,696.

The carbonyl compounds of formula (III) can, depending on the nature of the symbol R, be an aldehyde or ketone such as:

Aldehydes: ethanal, propanal, 2,2-dimethylpropanal, hexanal, 2-ethyl-butanal, heptanal, 2-propylpentanal, 2-methyl-octanal, 2,6-dimethyl-heptanal, citral, decanal, 6-methyl-2-propyl-hexanal, 2-isobutyl-4-methyl-pentanal, dodecanal, cyclopropanecarbaldehyde, cyclobutanecarbaldehyde, cyclopentanecarbaldehyde, cyclo-hexanecarbaldehyde, cycloheptanecarbaldehyde, cyclohexylethanal, 2-phenyl-propanal, diphenylethanal, diphenylbromoethanal, phenyl-p-toluylethanal, 2,3-diphenylpropanal, triethylethanal, 2,2,3-triphenyl-propanal, phenylcyclohexylethanal, cinnamaldehyde, diphenylcyclohexylethanal, α-phenyl-cinnamaldehyde, α-(p-chlorophenyl)-cinnamaldehyde, (1-naphthyl)-ethanal, 2-furaldehyde, piperonal, pyridine-2-carbaldehyde, pyridine-4-carbaldehyde, 3-methyl-2-furaldehyde, 3,5-dimethyl-2-furaldehyde, 5-benzyl-2-furaldehyde, 4,6-dimethyl-pyrimidine-2-carbaldehyde, indole-3-carbaldehyde, α-thiophene-3-carbaldehyde, 1,2,3-triazole-4-carbaldehyde, 1-phenyl-1,2,3-triazole-4-carbaldehyde, 1,5-diphenyl-b 1,2,3-triazole-4-carbaldehyde, benzaldehyde, o- and p-chlorobenzaldehyde, o- and p-fluorobenzaldehyde, o-, m- and p-tolualdehyde, p-ethylbenzaldehyde, 2,4-dimethyl-benzaldehyde, p-(tertiary butyl)-benzaldehyde, cumaldehyde, salicylaldehyde, p-hydroxybenzaldehyde, protocatechaldehyde, β-resorcilaldehyde, o-vanillin, vanillin, veratraldehyde, o- and p-nitrobenzaldehyde, o- and p-anisaldehyde, 3-ethoxy-4-hydroxybenzaldehyde, 2,4,5-trimethoxybenzaldehyde, o- and p-phenylbenzaldehyde, (p-nitrophenyl)-benzaldehyde, p-(p-tolyl)-benzaldehyde, o- and p-benzylbenzaldehyde, o- and p-phenoxy-benzaldehyde, p-thiophenoxybenzaldehyde, p-cyclohexylbenzaldehyde, p-cyclopentylbenzaldehyde, α-naphthaldehyde, β-naphthaldehyde, 1-methyl-4-naphthaldehyde, 1,6-dimethyl-4-naphthaldehyde, 1-hydroxy-4-naphthaldehyde, 2,3-dihydroxy-1-naphthaldehyde, 4-formyl-diphenylsulphone, 4-formylazobenzene, 4-formyl-azoxy-benzene and 4-formylbenzophenone.

Ketones: acetone, methyl ethyl ketone, methyl n-propyl ketone, diethyl ketone, 2-methyl-3-butanone, 2-hexanone, 3-hexanone, 2-methyl-3-pentanone, 4-methyl-2-pentanone, 2,2-dimethyl-3-butanone, 2-heptanone, 2-methyl3-hexanone, 2-methyl-5-hexanone, 3-ethyl-2 -pentanone, 2,4-dimethyl-3-pentanone, 3-octanone, 2-methyl-5-heptanone, 4,5-dimethyl-3-hexanone, 2,2,4-trimethyl-3-pentanone, 3,3,4,4-tetramethyl-2-pentanone, monochloroacetone, monobromoacetone, methyl 1-bromo-ethyl ketone, phenyl cyclopropyl ketone, dicyclobutyl ketone, methyl cyclopentyl ketone, cyclohexylacetone, phenyl cyclohexyl ketone, cyclobutanone, 2-methyl-cyclopentanone, cyclohexanone, 3-methyl-6-isopropylidene-cyclohexanone, 3-methyl-cyclohexanone, 4,4-dimethyl-cyclohexanone, 3-isobutyl-cyclohexanone, 2,6-dichloro-cyclohexanone, phenylacetone, 1,1,1-triphenyl-acetone, benzylacetone, dibenzyl ketone, ethyl 2-phenyl-ethyl ketone, di-(3-phenyl-propyl) ketone, acetophenone, propiophenone, isobutyrophenone, pivalophenone, valerophenone, phenyl benzyl ketone, benzophenone, bromoacetophenone, p-chlorobenzophenone, 1'-butyro-naphthone, 1-(2-pyridyl)-1-butanone, chalcone, di-(2-furyl) ketone, 2-furyl 2-pyridyl ketone and bis-(5-methyl-2-thienyl) ketone.

The polyimines of formula (I) can be prepared from polyamines and aldehydes or ketones such as those mentioned above, by applying the method described by BUU-HOI et al. (Bull. Soc. Chim. Fr. (1956) p. 710).

When the polyimines of formula (I) are prepared from an aldehyde (R = hydrogen in formula I), the reagents (aldehydes and polyamine) are preferably chosen such that, in at least one of them, the reactive group or groups (—CHO or —NH$_2$) are bonded directly to a carbon atom of an aromatic or heterocyclic ring.

Typical polyimines which may be used include:

Bis-(4-benzylideneamino-phenyl)-methane
2,2-Bis-(4-benzylideneamino-phenyl)-propane
Bis-(4-benzylideneaminophenyl)-sulphone
Bis-(4-benzylideneamino-phenyl) ether
1,4-Bis-(benzylideneamino-methyl)-benzene
Bis-(4-salicylideneamino-phenyl)-methane
Bis-(4-salicylideneamino-phenyl)-sulphone
Bis-(4-o-chlorobenzylideneamino-phenyl)-sulphone
Bis-(3,4-methylenedioxy-4-benzylideneamino-phenyl)-sulphone
Bis-(4-p-methoxybenzylideneamino-phenyl)-sulphone
Bis-(4-thienylideneamino-phenyl)-sulphone Bis-(4-furfurylideneamino-phenyl)-methane
Bis-(4-furfurylideneamino-phenyl)-sulphone
Bis-(4-naphthylmethylideneamino-phenyl)-methane
2,6-Bis-(benzylideneamino)-pyridine
2,6-Bis-(salicylideneamino)-pyridine
2,6-Bis-(furfurylideneamino)-pyridine
6,6'-Bis-(benzylideneamino)-2,2'-dipyridyl
Bis-(4-heptylideneamino-phenyl)-methane
Bis-(4-p-phenylsulphonylbenzylideneamino-phenyl)-methane
Bis-(4-p-phenylazobenzylideneamino-phenyl)-methane
Bis-[4-(2-pyridyl)methylideneamino-phenyl]-methane
1,4-Bis-(benzylideneamino)-benzene
1,3-Bis-(benzylideneamino)-benzene
3,5-Bis-(4-benzylideneamino-phenyl)-pyridine
1,6-Bis-(1,3-dimethyl-butylideneamino)-hexane
Bis-(4-cyclohexylideneamino-phenyl) ether
1,4-Bis-(1,3-dimethyl-butylideneaminomethyl)-benzene
Bis-[1-(2-pyridyl)-4-butylideneamino-phenyl]-methane
Bis-[1-(1'-naphthyl)-4-butylideneamino-phenyl]-methane
Bis-[di-(5-methyl-2-thienyl)-4-methylideneamino-phenyl]-methane
Bis-(1-methyl-4-benzylideneamino-phenyl)-methane
Bis-(1-ethyl-4-benzylideneamino-phenyl)-methane
Bis-(1-benzyl-4-ethylideneamino-phenyl)-methane
Bis-(1,3-dimethyl-4-butylideneamino-phenyl)-methane
Bis-(4-dibenzylmethylideneamino-phenyl)-methane
Bis-(1-methyl-3-phenyl-4-propylideneamino-phenyl)-methane
Bis-(1-benzyl-4-benzylideneamino-phenyl)-methane
Bis-(1-phenyl-4-benzylideneamino-phenyl)-methane
Bis-(1,3-diphenyl-4-prop-2-enylideneamino-phenyl)-methane
Bis-[4-di-(2-furyl)methylideneamino-phenyl]-methane and
Bis-[4-(2-furyl)-(2-pyridyl)methylideneamino-phenyl]-methane.

The multicellular polymers of this invention are prepared as a result of two phenomena. Firstly, there is the formation of volatile compounds within the polymer by reacting the polyimine (I) with maleic anhydride, and, secondly, there is the curing of the polymer.

In general terms, it is desirable for the amounts of polyimine and maleic anhydride employed to be such that there are 0.5 to 5 mols of anhydride per imine group, and that the reaction mixture contains 2 to 200 parts of polyimine per 100 parts of liquid polymer.

Depending on the nature of the polyamine, the formation of volatile compounds can either begin at a temperature ($T_1$) below 20°C, or it can only begin to be perceptible on heating to a temperature as high as 300°C.

The curing temperature ($T_2$) of the polymers also depends on the nature of the polymer and on the optional presence of substances which can act as catalysts or, on the other hand, as inhibitors. Because of these variables, the curing can begin at a temperature from ambient temperature to 300°C. or even higher.

It should be noted that both these reactions are frequently exothermic; because of this, it is often desirable to remove at least part of the heat produced.

For the purpose of producing a uniform cellular structure, it is also important to ensure that the curing of the resin and the evolution of the volatile materials take place in step with one another. For example, it is permissible to allow a portion of the volatile compounds to be evolved before heating the reaction mixture to a temperature which brings about the curing of the resin.

An advantageous method of working, especially when the temperature $T_1$ is rather low, consists of mixing one of the reagents (anhydride or imine) with the polymer, the second reagent being incorporated afterwards. Of course, when the anhydride/imine mixture reacts only at a relatively high temperature, it is possible to incorporate this mixture directly into the polymer or to form the polymer/anhydride/imine mixture in a single operation.

In general terms, it is desirable to choose a polyimine and a polymer such that the formation of volatile products which result from the reaction of annhydride with imine takes place whilst the polymer is sufficiently fluid to permit an increase in volume without creating internal stresses, but is nevertheless sufficiently advanced for the cellular structure not to disappear before curing. Because of this, with polymers which, of their own accord or under the effect of a curing agent, begin to solidify at a relatively low temperature, it is desirable to use a polyimine which reacts with maleic anhydride without requiring a supply of heat.

When the polymer cures of its own accord only at a relatively high temperature, it is possible to use a polyimine such that $T_1$ is reached only when the polymer begins to solidify, or to incorporate into the polymer an agent which makes it possible to lower the curing temperature.

The choice of specific polyimine/polymer combinations can, of course, readily be made by those skilled in the art of thermosetting polymers.

The cellular polymers of the present invention can be prepared in a mould which corresponds, at least partially, to the final shape of the material which it is desired to produce. It is of course possible to manufacture plates or blocks of cellular material and to cut them thereafter to the desired shape.

It is possible to manufacture cellular materials from numerous polymers provided the latter are liquid at the temperature $T_1$. Examples include epoxy resins, phenolic resins, unsaturated polyesters and the products formed from unsaturated polyimides.

The epoxy resins which may be used can be very varied. The glycidyl ethers produced by reacting polyols such as glycerol, trimethylolpropane, butanediol or pentaerythritol with epichlorohydrin, in known manner, may be mentioned by way of example. Other suitable epoxy resins include the glycidyl ethers of phenols such as 2,2-bis-(4-hydroxy-phenyl)-propane, bis-(hydroxy-phenyl)-methane, resorcinol, hydroquinone, pyrocatechol, phloroglucinol, 4,4'-dihydroxy-diphenyl and phenol/aldehyde condensation products. it is also possible to use the products of reaction of epichlorohydrin with primary or secondary amines such as bis-(4-methylamino-phenyl)-methane or bis-(4-amino-phenyl)-sulphone as well as aliphatic or alicyclic polyepoxides resulting from the epoxidation, by means of peracids, of the corresponding unsaturated derivatieves. These various types of epoxy resins are well described in the literature, and, as far as their preparation is concerned, reference can, for example, be made to Houben-Weil, volume 14/2, page 462. The epoxy resins in which each molecule possesses at least 2 and preferably more than 3 epoxy groups are of particular value; amongst the latter, essentially aromatic resins such as the glycidyl ethers of poly-(hydroxy-phenyl)-alkanes or phenol-formaldehyde resins as well as the resins of the cycloaliphatic type such as those described in French Pat. No. 1,504,104 are preferred.

The curing of the epoxy resins can, depending on the particular reagents, be effected with or without the intervention of a curing agent. When it is desired to make use of such an agent, it is possible to employ the products, the use of which is now well known in epoxy resin technology, such as tertiary amines, Lewis acids, especially in the form of complexes, primary and secondary amines, phenols and polyfunctional organic acids, anhydrides of mono- or polyfunctional organic acids and various other products such as those mentioned in the Encyclopedia of Polymer Science and Technology, vol. 6, p. 222 et seq.

The preparation of phenolic resins is also extensively described, for example in "The Chemistry of Phenolic Resins" Robert W. Martin. By way of illustration of such phenolic resins, there may be mentioned the products resulting from the condensation of a phenol, such as phenol itself, cresols or xylenols, with an aldehyde such as formaldehyde, acetaldehyde, butyraldehyde or 2-furaldehyde. It is, of course, possible to use mixtures of phenols and/or of aldehydes. Depending on the nature and the proportions of the reagents employed, it is sometimes necessary to use a curing agent such as hexamethylene-tetraamine or a cyclic formal, for example 1,3-dioxane,4-phenyl-1,3-dioxolane or 4-methyl-1,3-dioxolane, as one skilled in the art will appreciate.

The unsaturated polyesters are usually prepared by polycondensation of polycarboxylic acid derivatives and polyols; by "polycarboxylic acid derivatives" are meant acids, esters of lower alcohols, acid chlorides and anhydrides. Amongst the monomers which undergo poly-condensaton, at least one contains an olefinic unsaturated bond. The unsaturated polyesters for which the starting unsaturated polycarboxylic acid derivatives are di-acids or di-anhydrides which have an olefinic double bond in the $\alpha$, $\beta$-position are preferably used. Examples of polycarboxylic acid derivatives include maleic, chloromaleic, itaconic, citraconic, aconitic, pyrocinchonic, fumaric, chlorendic, endomethylene-tetrahydrophthalic, tetrahydrophthalic, ethylmaleic, succinic, sebacic, phthalic, isophtalic, terephthalic, adipic and hexahydrophthalic derivatives. Amongst the polyols, those most commonly used are ethylene glycol, propylene glycol, diethylene glycol, triethylene glycol, neopentyl glycol, tetraethylene glycol, butylene glycol, dipropylene glycol, glycerol, trimethylol-propane, pentaerythritol, sorbitol and 3,3-bis(hydroxymethyl)-cyclohexene.

The term "unsaturated polyester" is also intended to cover solutions of the polycondensates described above in a monomer (M) which can copolymerise with them. These monomers are also well known in the polyester at and include styrene, $\alpha$-methylstyrene, vinyltoluene, p-)$\alpha$-methylvinyl)-benaophenone, divinylbenzene, vinyl 2-chloroethyl ether, N-vinylpyrrolidone, 2-vinylpyridine, indene, methyl acrylate, methyl methacrylate, acrylamide, N-(t. butyl)-acrylamide, acrylonitrile, hexahydro-1,3,5-s-triacrylotriazine, allyl phthalate, allyl fumarate, ally cyanurate, allyl phosphate, diethylene glycol diallylcarbonate, allyl lactate, allyl malonate, allyl tricarballylate, allyl trimesate and allyl trimellate. When use, the monomer (M) generally represents 10percent to 60percent of the weight of the unsaturated polyester solution.

The unsaturated polyesters can be prepared by applying known methos (see for example, KIRK-OTHMER: Encyclopedia of Chemical Technology, 2nd edition, Volume 20).

Amongst the products formed from unsaturated polyimides there may be mentioned the prepolymers formed from an N,N'-bis-imide o an unsaturted dicarboxylic acid and a diprimary diamine, as described in, for example, French Pat. No. 1,555,564. There may also be mentioned the thermosetting polyers formed, in accordance with French Pat. No. 2,022,609, from a bis-maleimide, a polyamine with at least two primary amino groups and amino-type compound which can be a polyamine with at least one secondary amino group, a primary monoamine or a secondary mono-amine. It is also possible to use the prepolymers formed from a bis-imide such as described in French Pat. No. 1,555,564 and a polyamine of formula (IV). Prepolymers formed from a polyamine of formula (II) and an oligomer with an imide group, of the general formula:

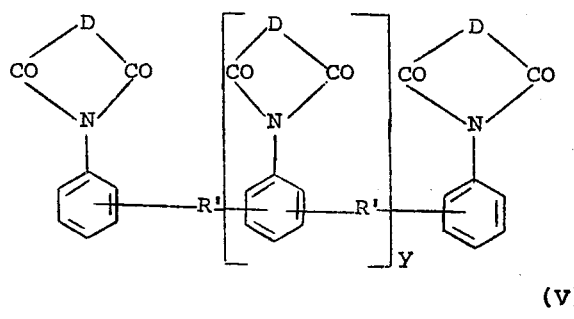

(V)

wherein R' and Y are as defined above and D represents a divalent organic radical possessing 2 to 24 carbon atoms, the valencies of which are carried by adjacent carbon atoms, and which is derived from an internal anhydride of the general formula:

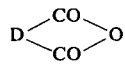

(VI)

at least 60percent of the radicals D containing a polymerisable carbon-carbon double bond, may also be mentioned.

Other polyimide resins which can be used can be produced by replacing, in each of the above cases, all or part of the diamine and/or polyamine by an alazine of the formula:

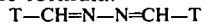 (VII)

whrein T denotes a monovalent aromatic radical, in particular benzalazine, p-methoxy-benzalazine, p-nitrobenzalazine and p-chloro-benzalazine.

These various imide prepolymers can be modified by the incorporation, before curing, of a monomer other than an imide, conatining at least one polymerisable —CH=C< group, for example a monomer mentioned in French Pat. No. 2,094,607, or by the incorporation of an unsaturated polyester such as one of those described above or of a polysulphone, in accordance with the techniques described, respectively, in French Pat. Nos. 2,102,878 and 2,102,796.

In the preparation of the multicellular polymers according to the present invention, it is also possible to incorporate into the reaction mixture whilst it is still fluid, or into one of the constituents before producing the mixture, liquid adjuvants or solids in the form of powders, spheres, platelets, granules, fibres or flakes, for the purpose of improving certain characteristics of the final product. Surface-active agents, in particular, can be employed for the purpose of improving the homogeneity of the cellular structure. Suitable such agents include copolymers possessing polysiloxane-polyoxyalkylene blocks, such as those described in "Plastic Foams", Calvin J. BENNING, vol. 2, pages 320–325. They are generally used in an amount from 0.1 to 2percent of the weight of the reaction mixture. It is also possible to employ pulverulent fillers, generally used in an amount from 5 to 50percent of the weight of the reaction mixture, in particulr silica, quartz, alumina, titanium oxide, talc, kalolin, mica, calcium carbonate, graphite and carbon black. It is also possible to make use of adjuvants which improve the heat resistance and the flameproof character of the products, such as boric anhydride. The amount of boric anhydride used can be as mush as 20percent of the weight of the reaction mixture. Finally, it is possible to increase and accelerate the expansion of the polymer by using a pore-forming agent such as azodicarbonamide.

The polymers of the present invention are particularly suitable for the production of lightweight structures, especially those intended for the building industry and aeronautical and space industries.

The following Examples further illustrate the present invention. In these Examples, the compressive strengths are measured in accordance with ASTM Standard Specification D 1621–59 T (10percent deformation).

EXAMPLE 1

10 g. of an epoxy resin of the average formula:

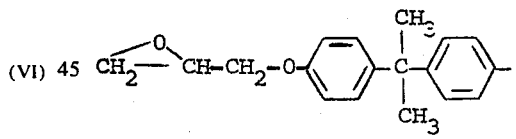

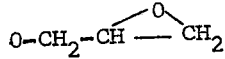

the epoxy equivalent of which is 185–192, 9 g. of methylnadic anhydride (methylbicyclo-(2,2,1)hept-5-ene-2,3-dicarboxylic acid anhydride), and 0.15 g. of 2,4,6-tris-(dimethylaminomethyl)-phenol are introduced, at 25°C, into a cylindrical container of diameter 7 cm. and height 6 cm.

The mixture is heated at 50°C., until it is homogeneous and 4 g. of maleic anhydride are added with stirring. After dissolution, 5.6 g. of 1,6-bis-(1,3-diemthyl-butylideneamino)-hexane are incorporated into the mixture.

The whole is placed for 30 minutes in an oven which has been pre-heated to 150°C., a multicellular polymer of apparent density 0.33 is obtained.

Compressive strength: 8 kg/cm².

EXAMPLE 2

The procedure of Example 1 is followed, but with 6 g. of maleic anhydride and 8.5 g. of bis-imine.

The oven is pre-heated to 200°C., and, after 30 minutes, a rigid multicellular polymer of apparent density 0.16 is obtained.

EXAMPLE 3

The following constituents are mixed at 25°C: 4 g. of maleic anhydride and 10 g. of a prepolymer with a softening point of 90°C., formed from N,N',4,4'-diphenylmethane-bis-maleimide and bis-(4-aminophenyl)-methane in an imide/diamine molar ratio of 2.5

The mixture is poured into a cylindrical container (φ [diameter] 7 cm. and height 6 cm.) and then 5.6 g. of 1,6-bis-(1,3-diemthyl-butylideneamino)-hexane are added with stirring.

The whole is kept for 1 hour in an oven which has been pre-heated to 200°C; a rigid cellular polymer of apparent density 0.11 is obtained.

Compressive strength: 10 kg/cm².

EXAMPLE 4

The following constituents are mixed at 25°C:
15 g. of an epoxy resin of the average formula:

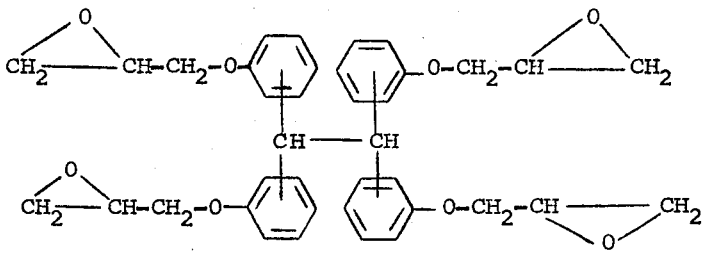

the epoxy equivalent of which is 200–240, 9 g. of methylnadic anhydrine and 0.25 g. of 2,3,6-tris-(dimethylaminomethyl)-phenol. 5 g. of maleic anhydride are then added with stirring followed, after dissolution, by 7.5 g. of 1,6-bis-(1,3-dimethyl-butylideneamino)-hexane.

The whole, placed in a cylindrical container (φ 70 mm. and height 70 mm.) is kept for 1 hour in an oven which has been pre-heated to 150°C; a multicellular polymer of apparent density 0.47 is obtained.

Compressive strength: 15 kg/cm².

EXAMPLE 5

The following constituents are mixed at 25°C:
10 g. of the epoxy resin used in Example 4 and 7.5 g. of maleic anhydride, and then 5.5 g. of 1,6-bis-(1,3-dimethyl-butylideneamino)-hexane are added.

The whole is kept for 1 hour in an oven which has been pre-heated to 150°C; a multicellular polymer of apparent density 0.13 is obtained.

EXAMPLE 6

The following constituents are mixed at 25°C:
10 g. of the epoxy resin used in Example 1 and 5.8 g. of maleic anhydride, and then 10 g. of bis-(1,3-dimethyl-4-butylideneamino-phenyl)-methane are added.

The whole is kept for 1 hour in an oven which has been pre-heated to 150°C; a cellular polymer of apparent density 0.38 is obtained.

EXAMPLE 7

The test of Example 6 is repeated using 11.5 g. of maleic anhydride.

The apparent density of the cellular polymer is 0.34.

EXAMPLE 8

The test of Example 6 is repeated, using 10 g. of the epoxy resin employed in Example 4.

The apparent density of the multicellular polymer is 0.2.

EXAMPLE 9

By repeating the test of Example 7 with 10 g. of the epoxy resin used in Example 4, a multicellular polymer of apparent density 0.23 is obtained.

EXAMPLE 10

The following constituents are mixed at 25°C:
15 g. of the epoxy resin used in Example 1 and 8 g. of maleic anhydride, and then 6.2 g. of bis-(4-cyclohexylideneamino-phenyl)ether are added.

The whole is placed in an oven which has been pre-heated to 175°C., and the temperature is raised to 190°C., over the course of 20 minutes. A multicellular polymer of apparent density 0.1 is obtained.

Compressive strength: 8 kg/cm².

EXAMPLE 11

The following constituents are mixed at 25°C:
8 g. of maleic anhydride, 15 g. of the epoxy resin used in Example 1 and 1 g. of a surface-active agent which is a copolymer possessing dimethylpolysiloxane-polyoxyalkylene blocks, the organic blocks of which are terminated by OH groups, prepared in accordance with the technique described in French Pat. No. 1,175,305.

7.2 g. of bis-(4-cyclohexylideneamino-phenyl)-ether are added with stirring and the whole is kept for 1 hour in an oven which has been pre-heated to 175°C. The multicellular polymer obtained has an apparent density of 0.1.

Compressive strength: 8 kg/cm².

EXAMPLE 12

The experiment of Example 11 is repeated, using 1,4-bis-(1,3-dimethyl-butylideneamino-methyl)-benzene (6 g.) as the bis-imine.

The whole is kept for 30 minutes in an oven which has been pre-heated to 175°C; a cellular polymer of apparent density 0.15 is obtained.

EXAMPLE 13

The experiment of Example 11 is repeated, using bis-(4-heptylideneamino-phenyl)-methane as the bis-imine.

The whole is kept for 1 hour in an oven which has been pre-heated to 175°C; a cellular polymer of apparent density 0.05 is obtained.

EXAMPLE 14

The test of Example 10 is repeated, using 1,4-bis-(benzylideneaminomethyl)-benzene (6.2 g.) as the imine.

The polymer obtained has an apparent density of 0.10.

EXAMPLE 15

The following constituents are mixed at 25°C:
7.5 g. of the epoxy resin used in Example 1, 5 g. of maleic anhydride, 0.35 g of azodicarbonamide and 2.5 g. of bis-(4-benzylideneamino-phenyl)-methane.

The whole is placed is placed in an oven at 180°C., for 1 hour. A cellular polymer of density 0.043 is obtained.

The compressive strength is 4 kg/cm².

We claim:

1. Process for preparing a multicellular material which comprises curing a liquid polymer selected from a 1,2-epoxy resin, a phenol-aldehyde resin, an unsaturated polyester and a polymeric reaction product of an unsaturated polyamine with a polyimine in the presence of a reaction product of maleic anhydride with a polyamine of the general formula:

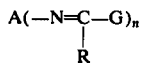

$$A(-N=C-G)_n \quad (I)$$
$$\quad\quad\ \ |$$
$$\quad\quad\ \ R$$

in which $n$ represents a number at least equal to 2, G represents a monovalent organic radical containing less than 35 carbon atoms, R is as defined under G or represents a hydrogen atom, or G and R together form a divalent hydrocarbon radical, and A represents an organic radical of valency $n$ containing 2 to 50 carbon atoms.

2. Process according to claim 1 in which the epoxy resin is a glycidyl ether of 2,2-bis(4-hydroxyphenyl) propane or a 1,1,2,2-tetra(hydroxyphenyl)ethane.

3. Process according to claim 1 in which the polyimide polymer is a prepolymer of N,N'-4,4'-diphenylmethane-bis-maleimide and bis-(4-aminophenyl)-methane.

4. Process according to claim 1 in which the proportions of the reagents are such that there are 2 to 200 parts by weight of polyimine per 100 parts of liquid polymer and 0.5 to 5 mols of maleic anhydride per imine group in the polyimine.

5. Process according to claim 1 in which the polyimine of formula (I) is produced by reacting one mol of a polyamine of the formula:

$$A-(NH_2)_n \quad (II)$$

with $n$ mols of a carbonyl compound of the formula:

$$G-C{\overset{O}{\underset{R}{\lessgtr}}} \quad (III)$$

in which $n$, A, G and R are as defined in claim 1.

6. Process according to claim 5 in which R represents a hydrogen atom.

7. Process according to claim 5 in which R represents a methyl radical.

8. Process according to claim 5 in which in the aldehyde and/or the polyamine, the —CHO group and/or the —NH₂ groups respectively are bonded directly to a carbon atom of an aromatic or heterocyclic ring.

9. Process according to claim 1 in which G represents a 2-methylpropyl, cyclohexyl, phenyl or n-hexyl radical.

10. Process according to claim 1 in which $n$ is 2.

11. Process according to claim 10 in which A represents a methylene or hexylene radical, a diphenylene ether or diphenylenemethane radical or a para-dimethylene benzene radical.

* * * * *